(12) United States Patent
Wahl et al.

(10) Patent No.: US 8,663,854 B2
(45) Date of Patent: Mar. 4, 2014

(54) FUEL CELL SYSTEM WITH A COMPENSATION REGION FOR MOISTENING AND/OR TEMPERING

(75) Inventors: Florian Wahl, Lohr (DE); Sebastian Maass, Stuttgart (DE); Uwe Limbeck, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 12/498,766

(22) Filed: Jul. 7, 2009

(65) Prior Publication Data

US 2010/0092810 A1 Apr. 15, 2010

(30) Foreign Application Priority Data

Jul. 7, 2008 (DE) .......................... 10 2008 040 208

(51) Int. Cl.
*H01M 8/06* (2006.01)
(52) U.S. Cl.
USPC .......................................... 429/413; 429/408
(58) Field of Classification Search
USPC ....................................................... 429/413
See application file for complete search history.

(56) References Cited

U.S. PATENT DOCUMENTS

2007/0196720 A1* 8/2007 Skala .............................. 429/38

FOREIGN PATENT DOCUMENTS

| DE | 10217712 A1 | 11/2003 |
|---|---|---|
| DE | 10346594 A1 | 5/2005 |
| JP | 2008146859 A | 6/2003 |
| JP | 200748643 A | 2/2007 |
| WO | WO0017952 A1 | 3/2000 |
| WO | 2008017155 A1 | 2/2008 |

* cited by examiner

*Primary Examiner* — Ula C Ruddock
*Assistant Examiner* — Jacob Marks
(74) *Attorney, Agent, or Firm* — Michael Best & Friedrich LLP

(57) ABSTRACT

The subject of the present invention is a fuel cell system having at least one fuel cell which has an anode, a cathode, and a membrane element. Two electrode chambers are disposed in the fuel cell, and the electrode chambers are an anode chamber and a cathode chamber. An educt flows into the anode chamber and into the cathode chamber by means of a respective incoming stream. According to the invention, it is provided that at least one compensation region is disposed on the end of the membrane element and serves solely to moisten and/or temper at least one of the incoming streams.

19 Claims, 3 Drawing Sheets

FUEL CELL SYSTEM WITH A COMPENSATION REGION FOR MOISTENING AND/OR TEMPERING

CROSS-REFERENCE TO RELATED APPLICATION

This application is based on German Patent Application 10 2008 040 208.7 filed Jul. 7, 2008.

BACKGROUND OF THE INVENTION

1. Field of the Invention

The invention relates to a fuel cell system having at least one fuel cell, the fuel cell having an anode, a cathode, and a membrane element, and two electrode chambers are disposed in the fuel cell, and the electrode chambers are an anode chamber and a cathode chamber, and an educt flows into the anode chamber and into the cathode chamber by means of a respective incoming stream.

2. Description of the Prior Art

From German Patent Disclosure DE 103 46 594 A1, a polymer-electrolyte-membrane (PEM) fuel cell is known. PEM fuel cells typically include a membrane-electrode array (MEA), which is constructed of two catalyst layers, which function as an anode and a cathode, and a polymer membrane disposed between them. The performance of an MEA depends strongly on the operating conditions, among others for instance the adequate delivery of educts to all locations in the array, the moisture, and the temperature. To that end, in the aforementioned document, at least one of the electrode chambers has one additional wall, so that a new additional chamber is created. Into this chamber, water is introduced, but also optionally the educts are introduced into the electrode chamber. Because the wall is designed as impermeable, with isolated permeable regions, a uniform distribution of the moisture and of the educts is supposed to be attained.

However, in the aforementioned document, it is necessary to introduce one further wall, and possibly even more such walls, into each fuel cell. This increases the weight and the cost. Furthermore, the problem of moisture is primarily a problem of the entry region of the electrode chambers.

Moreover, the problem just mentioned above, that the incoming streams should also be tempered, is neither described in the aforementioned document, nor does it show any solution to the problem. The incoming streams are tempered externally in the prior art. However, as an additional component, an external tempering device entails added expense and greater weight. It is also possible in the prior art to moisten the incoming streams externally. With external moisteners, however, the problem arises that because of the low temperatures, water condenses in the tubes of the external moistener. That water is lost for moistening purposes and leads to problems with droplet formation and icing. An external moistener is associated with added expense and greater weight as well.

OBJECT AND SUMMARY OF THE INVENTION

It is an object of the invention to develop a fuel cell that is more economical and has a lower weight, so that fuel cells can be used economically in the automotive field, for instance, as well. It is therefore a further object of the invention to create an apparatus and a method for moistening, humidifying, and/or tempering the incoming streams, without creating an additional, partitioned-off chamber or using an external moistener and/or tempering device.

According to the invention, it is provided that at least one compensation region is disposed on the end of the membrane element and serves solely to moisten and/or temper at least one of the incoming streams. The compensation region is disposed on one side of the membrane element, on which side at least one incoming stream reaches the fuel cell and thus initially flows along the compensation region. Thus this incoming stream is moistened and tempered before reaching the membrane element with the cathode and the anode, and thus before the onset of the electrochemical reaction. As a result, the transportation of ions, such as $H^+$ formed at the anode, that is necessary for operation of the fuel cell is facilitated by the membrane element and possibly accelerated as well. Thus the performance of the fuel cell is enhanced, and premature ageing of the membrane element is averted. By means of the tempering, the desired temperature range within which the fuel cell functions optimally is reached earlier. Because the compensation region for moistening and/or tempering is disposed directly in the fuel cell, an external moistener or tempering device can be made smaller or even dispensed with entirely. As a result, the problems of the external moistener with. droplet formation and icing are also avoided. Moreover, no further structural walls that are expensive or heavy are needed in the fuel cell the way they are in DE 103 46 594 A1. This makes simple production and a simple fuel cell construction possible. This makes for economies of cost and weight. Because the additionally introduced region according to the invention serves the purpose solely of moistening and/or tempering, but not of generating current, the optimal operating conditions are better reached as early as the beginning of the membrane element and thus upstream of the region of the electrochemical reactions.

One advantageous feature of the fuel cell system provides that the fuel cell system is a system comprising polymer-electrolyte membrane fuel cells, and the membrane element together with the anode and the cathode forms a membrane-electrode array. The membrane-electrode array (MEA) is for its part disposed between two separator plates, which in the case of a fuel cell system may be embodied as bipolar plates. Located between the MEA and the separator plates are the anode chamber, on the anode side, and the cathode chamber, on the cathode side. If the educts are gaseous, then there is preferably one gas diffusion layer (GDL) each between the anode and cathode and the anode chamber and cathode chamber, respectively. As a reducing agent, hydrogen $H_2$ or an $H_2$-containing gas (such as reformate gas, which can be obtained by reforming petroleum, for instance, or gasoline, natural gas, biogas, or methanol) or the like can be used on the side of the anode. As a reducing agent, oxygen $O_2$ or oxygen-containing gas (such as air) can be used. Hereinafter, the terms $H_2$ and air will be used throughout, but the other variants mentioned above are equally possible. Another embodiment of the fuel cell system may be a system comprising direct methanol cells, in which methanol is used as a reducing agent. Instead of a membrane element, some other solid-state electrolyte may also be employed.

A further variant embodiment of the invention provides that the anode chamber and the cathode chamber each have an extension, and the length of the extension is essentially equivalent to the length of the compensation region. The separator plates, in particular, may be extended to the length of the compensation region, in order to assure that the material streams of the anode chamber and of the cathode chamber do not mix with one another. The separator plates may include conduits for a coolant. Because an extension of the coolant conduits in the region of the compensation region makes for an extension of the separator plates, a heat transfer can take place between the incoming streams and the coolant in the area of the compensation region.

In an advantageous embodiment, the compensation region can contain a water-permeable means, in particular a membrane. In view of simple production and a simple fuel cell construction, it is especially advantageous if the polymer-electrolyte membrane of the MEA, for instance, is extended into the compensation region, thus obtaining a water-permeable compensation region. As a more-economical alternative, types of membranes of the kind used for air-to-air humidification can also be employed.

In a further embodiment, the water-permeable means, on a side pointing toward the cathode chamber, can contain a catalyst layer. Thus the side of the compensation region that can be seen from the cathode chamber in the top view is provided with a catalyst layer. This serves to cause the water diffusing through the compensation region to react and thus to avoid an uncontrolled exothermic reaction in the cathode chamber and beyond that to avoid hydrogen emissions.

In addition or as an alternative to this, a gas diffusion layer can be disposed on a side of the water-permeable means pointing toward the cathode chamber and/or the anode chamber. The gas diffusion layer that points toward a water-liberating electrode chamber is preferably designed as hydrophilic, and the gas diffusion layer that points toward a water-absorbing electrode chamber is preferably designed as hydrophobic. Water molecules accumulate to an increased degree in the hydrophilic GDL. Especially preferably, so many molecules in fact accumulate there that a liquid phase is attained in the hydrophilic GDL. The GDL on the side that points toward the electrode chamber of the water-absorbing incoming stream is preferably embodied hydrophobically, so that on that side, no water accumulates, and especially preferably, precisely the same moisture prevails as in the gas phase of the incoming stream. By means of both provisions, the concentration gradient of the water through the membrane is increased. Especially preferably, the concentration gradient is maximized for the ease in which the concentration in the liquid water on one side and the moisture concentration of the gas phase on the other are equivalent, so that a maximum amount of water is liberated. Because a liquid water phase is attained on one side, the diffusion of the hydrogen through the membrane is also made more difficult.

The compensation region should have the same thickness as the MEA itself and should accordingly not have a different flow resistance. By the use of the gas diffusion layers, the same thickness as the MBA can be attained, without having to make the membrane of the compensation region thicker than the membrane of the MEA. As a result, the use of the GDL is also especially advantageous since because of the slight thickness of the membrane of the compensation region, the concentration gradient of the water is further increased. If it is not possible to use gas diffusion layers, then the difference in thickness can be compensated for by means of greater peripheral compression, suitable seals, or a thicker membrane in the peripheral region.

In a further embodiment, a portion of the compensation region is designed such that it serves only to temper at least one incoming stream, but not to moisten it. In this part of the compensation region, the cathode chamber and anode chamber are separated from one another by a material that is heat-permeable, but not water-permeable. The compensation region can have a temperature- and media-stable seal, in particular silicone. Preferably, the compensation region is lengthened by the portion that serves only for tempering. Because of the longer compensation region, the incoming stream can be tempered for a longer time, and the temperature range sought can be reached earlier. By the use of a compensation region designed in this way, the costs for a water-permeable means of even greater length, especially a membrane, are saved. This is especially favorable if moistening the incoming stream requires a lesser exchange area than the tempering area.

The technical development of membranes is in the direction in which membranes or other solid-state electrolytes can be operated in the dry state as well. If these electrolytes are used in the fuel cell of the invention, then the compensation region may be a region that has the material that is only heat-permeable. This region then serves the purpose only of heat exchange and no longer serves the purpose of moistening. For tempering, such a region is especially economical.

The aforementioned object is also attained by a method for moistening and/or tempering at least one fuel cell in a fuel cell system, the fuel cell having an anode, a cathode, and a membrane element, and two electrode chambers are disposed in the fuel cell, and the electrode chambers are an anode chamber and a cathode chamber, and an educt flows into the anode chamber and into the cathode chamber by means of a respective incoming stream, and at least one compensation region is disposed on the end of the membrane element. The method includes the following steps:

inflow of the educts, which are contained in the incoming streams, into the fuel cell;

electrochemical reaction of the educts, so that water is generated; and diffusion of the water from a first electrode chamber through the compensation region into a second electrode chamber, and/or conduction of an amount of heat through the compensation region between the electrode chambers, so that the incoming stream of the second electrode chamber is moistened and/or tempered.

The special feature here is that the water that is obtained by the electrochemical reaction is used so that at least one incoming stream of an electrode chamber is moistened by the higher moisture that prevails in the other electrode chamber on the side of the incoming stream to be moistened. Simultaneously or instead, a temperature adaptation to the other electrode chamber is also possible.

The method can provide that in a countercurrent mode, the water of an outgoing stream of the anode chamber moistens the incoming stream of the cathode chamber, and/or the water of an outgoing stream of the cathode chamber moistens the incoming stream of the anode chamber. If a fuel cell is operated in a countercurrent mode, then the incoming stream of the one electrode chamber is located on the opposite side from the incoming stream of the respective other electrode chamber. The outgoing stream of the one electrode chamber is thus located on the same side of the fuel cell as the incoming stream of the other electrode chamber. The outgoing streams of the two electrode chambers are enriched with water, because of the resultant product water, which is created by the electrochemical reaction in the region of the cathode but also reaches the side of anode chamber through the membrane element, and is thus moister than the incoming stream. This creates a concentration gradient of the water in the compensation region, which adjoins the membrane element and has a water-permeable means. The water molecules can follow along their concentration gradient through the water-permeable means and from the moist outgoing stream of the one electrode chamber they move into the dry incoming stream of the other electrode chamber and moisten it. It is advantageous here that the water already obtained from the electrochemical reaction is used directly for moistening the incoming streams. The water thus obtained is chemically highly pure, since because of the short distance to be covered, it has little contamination that could impair the function of the fuel cell. In the countercurrent mode, in the region of the membrane element, water also diffuses from the region located farther toward the exit, which is thus the moister region, of the one electrode chamber, through the membrane element into the other electrode chamber, which at this location, because of its closeness to its incoming stream, does not yet contain as much water. However, because of the lengthening of the travel distance that is available for the exchange of moisture, the transfer of moisture is improved. Moreover, the incoming streams are moistened before the first electrochemical reaction takes place and before ions, such as $H^+$ ions, are formed. This makes for gentle treatment of the membrane element. To attain moistening of the incoming stream of both the anode chamber and the cathode chamber, one compensation region each is preferably introduced on both ends of the membrane element.

If a fuel cell is operated in the cocurrent mode, then the incoming stream of the anode chamber and the incoming stream of the cathode chamber are located on the same side of the fuel cell. The same is true for the outgoing streams. Since now the water-rich and water-poor streams are each located on the same side of the fuel cell, compensation between the anode stream and the cathode stream does not initially seem appropriate. To avoid a loss of unreacted hydrogen, at least part of the outgoing anode stream is returned to the anode chamber. This is called the anode recirculation stream. The method can therefore also be used in such a way that in a cocurrent mode, the water, by means of an anode recirculation stream, is used for moistening the incoming stream of the cathode chamber. The anode recirculation stream initially assures that the incoming anode stream is moist. If there is a compensation region that adjoins the membrane element and that has a water-permeable part, then the water molecules can follow their diffusion gradient through the membrane element and can moisten the dry incoming stream, located on the other side, of the cathode chamber. Since according to the invention only the incoming stream of the cathode chamber is moistened by a diffusion of water molecules through a water-permeable part, only one compensation region, on the side of the incoming streams, is necessary. This makes a smaller structural form possible.

In addition to the moistening, the compensation region can also be used for tempering the incoming streams, since the compensation region is also heat-permeable at the same time. In the method, the amount of heat conducted through the compensation region can be heat from the electrochemical reaction or from a compression of an educt. First, it is conceivable for the incoming streams to be below the operating temperature, for instance at a temperature of a tank with an educt, or at an ambient temperature at which the air is aspirated. Second, however, it is also possible that by compression of an educt, this incoming stream is below the operating temperature. In the first case, heat from the electrochemical reaction is given off to the cold incoming stream. In the countercurrent mode, heat for that purpose from the warmer outgoing stream reaches the colder incoming stream, while in the cocurrent mode, heat from the incoming anode stream, which is warmer because of the anode recirculation stream, reaches the colder incoming stream of the cathode chamber. In the second case, the heat from an incoming stream in the countercurrent mode is given up to the outgoing stream of the other electrode chamber. In the cocurrent mode, heat passes over from a warmer incoming stream to a colder incoming stream. If one incoming stream is above the operating temperature and the other incoming stream is below the operating temperature, both incoming streams are thus advantageously tempered.

A further embodiment provides that a coolant flowing through a separate chamber, in a portion of the electrode chamber in the region of the compensation region, tempers at least one incoming stream. The separate chamber may be a conduit in a separator plate. Because the separator plates are lengthened in a region of the compensation region, the coolant also flows in the region of the compensation region. The coolant may contribute definitively to tempering the incoming streams.

The invention may be used repeatedly both in an individual fuel cell and in a fuel cell system.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
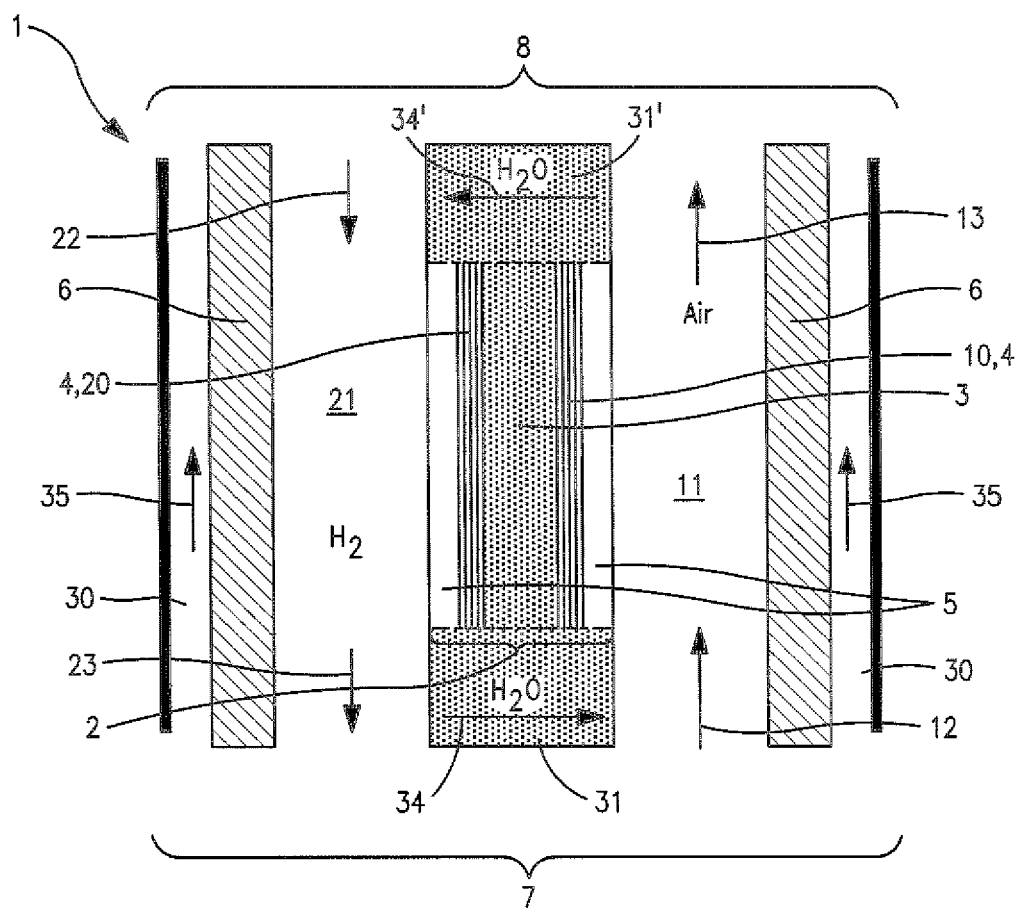
FIG. 1 is a section through a fuel cell of the invention in the countercurrent mode.
Figure 2:
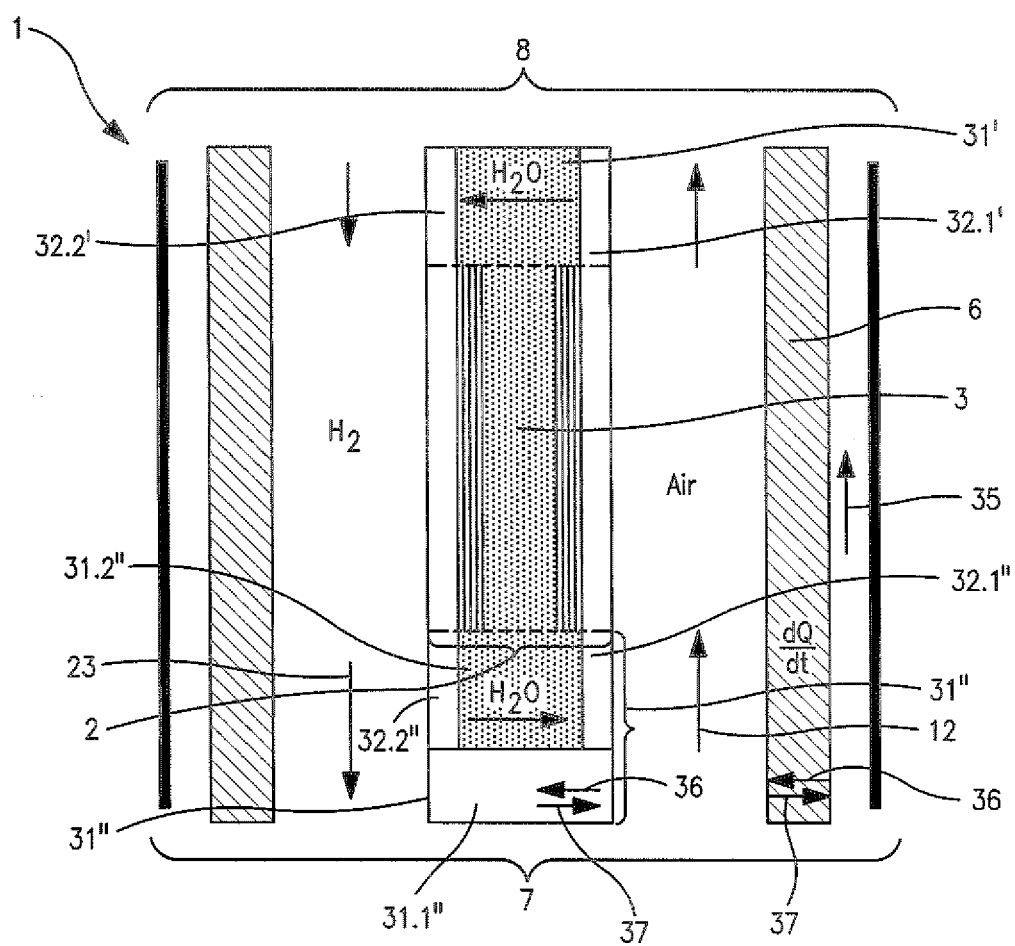
FIG. 2 shows a further exemplary embodiment of the fuel cell in the countercurrent mode.
Figure 3:
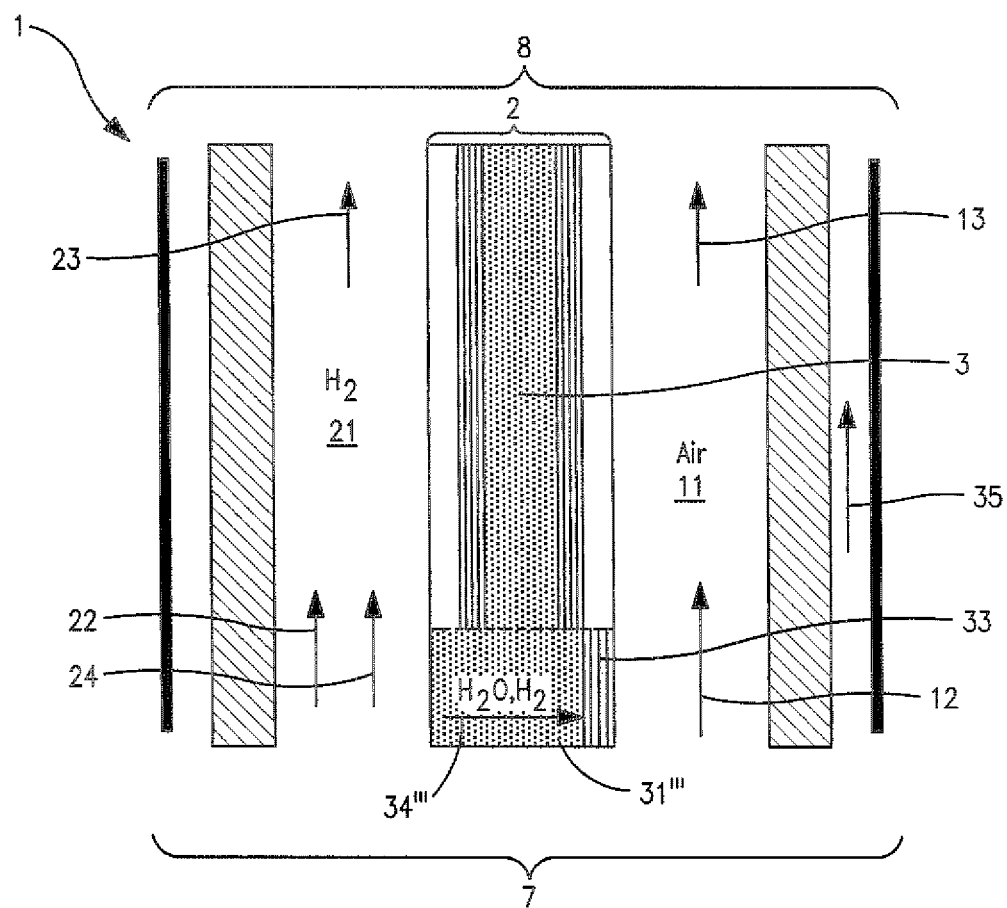
FIG. 3 is a section through a further fuel cell of the invention, in the cocurrent mode.

FIGS. 1 through 3 each show a schematic section through a fuel cell 1. In the middle of each, a membrane-electrode array (MEA) 2 is shown. It contains a polymer-electrolyte membrane (PEM) 3. Located on either side of the PEM 3 is a catalyst layer 4, which serves on the right-hand side as a cathode 10 and on the left-hand side as an anode 20. A gas diffusion layer (GDL) 5 is disposed on each catalyst layer 4. Parallel to both sides of the MEA 2, the fuel cell 1 has bipolar plates 6, which on the side of the anode 20 together with the MEA 2 define an anode chamber 21 and on the side of the cathode 10 together with the MEA 2 define a cathode chamber 11. Hydrogen, for example, flows as an educt through the anode chamber 21. This stream is called an incoming anode stream 22 as it enters the anode chamber 21 and an outgoing anode stream 23 as it leaves the anode chamber 21. For instance, air containing oxygen flows through the cathode chamber 11 and functions as an incoming cathode stream 12 on entering the cathode chamber 11 and functions as an outgoing cathode stream 13 on leaving it. In each of the bipolar plates 6, there is a respective conduit 30, through which a cooling medium flows in the direction of the arrows 35.

In FIGS. 1 and 2, a fuel cell 1 in the countercurrent mode is shown. Here the air enters the fuel cell 1 from the lower end 7, while the hydrogen is delivered from the upper end 8. There are a total of fifteen possible alternatives according to the invention, if the three options—which are that there is a compensation region only on the lower end 7, or only on the upper end 8, or on both ends 7 and 8—are combined with the three options that the compensation regions can be designed in a first variation with a water-permeable region, in a second variation with two portions, one of which one is water-permeable and the other is only heat-permeable, or in a third variation with an only heat-permeable region. Other alternatives arise if the compensation region has two portions, of which one is water-permeable and the other is only heat-permeable, since the order of the two portions is variable. Moreover, for each of these alternatives, it is conceivable for the water-permeable region to be equipped with a catalyst layer and/or a GDL on the side toward the cathode chamber 11 and/or with a GDL on the side toward the anode chamber 21. Of these options, only one is shown in FIG. 1 and one in FIG. 2 as examples; the other variations of the subject of the present invention are understood to be represented in the claims.

In FIG. 1, the PEM 3 of the MEA 2 is uncoated on both sides and has been lengthened without a GDL and adapted in thickness to the MEA 2. The result on the end 7 is a first compensation region 31 and on the end 8 a second compensation region 31'. The bipolar plates 6 have been lengthened in their longitudinal direction to the length of the compensation region, so that overall both the cathode chamber 11 and the anode chamber 21 have been lengthened. On the end 7, the incoming cathode stream 12 enters the fuel cell 1, and at the same time, the outgoing anode stream 23 exits the fuel cell 1. The water of the moist outgoing anode stream 23 diffuses through the compensation region 31 into the drier incoming cathode stream 12 in the direction of the arrow 34. At the end 8, the incoming anode stream 22 enters the fuel cell 1, and at the same time, the outgoing cathode stream 13 exits the fuel cell 1. The water from the moist outgoing cathode stream 13 diffuses through the compensation region 31' into the drier incoming anode stream 22, as indicated by the arrow 34°. Simultaneously with the water, heat can be transmitted in the same direction and simultaneously absorbed from the cooling medium or given up to the cooling medium by the bipolar plates 6.

In FIG. 2, a further fuel cell 1 according to the invention is also shown in the cocurrent mode, so that the same flow directions pertain as in FIG. 1. Once again at both ends 7 and 8, the MEA 2 is adjoined by water-permeable compensation regions 31' and 31". Both compensation regions 31' and 31" are designed as at least partly water-permeable, so that the same streams of water ensue as in FIG. 1. In addition, on the end 7 the compensation region 31" has a further non-permeable but heat-permeable part 31.1", which serves to temper the air. The compensation region 31" here has been lengthened. Through the compensation region 31.1" but naturally also through the water-permeable compensation regions or compensation parts, streams of heat dQ/dt are transmitted. The heat can be absorbed by the outgoing anode stream 23 and by the cooling medium in accordance with the arrows 36, when the temperature of the incoming cathode stream 12 is lower than the temperature of the outgoing anode stream 23 and of the coolant, or they can be given up to the outgoing anode stream 23 and to the coolant in accordance with the arrows 37, if the temperature of the incoming cathode stream 12 is higher than the temperature of the outgoing anode stream 23 and of the coolant. The flow direction of the coolant represented by the arrows 35 is preferably parallel to the cathode stream. In the case where the entering air is warmer than the coolant, and the entering hydrogen is colder than the coolant, and because the coolant as it flows through is heated by the bipolar plates 6, an especially high heat gradient results between the respective incoming streams and the coolant.

A water-permeable part 31.2" of the compensation region 31" and the likewise water-permeable compensation region 31' are provided with GDLs 32.1", 32.2" and 32.1', 32.2', respectively, so that the membrane of the compensation regions 31' and 31" is advantageously thinner than in FIG. 1, and the concentration gradient of the water can be increased. Likewise, the concentration gradient of the water is increased by providing that the gas diffusion layers 32.2" and 32.1', for instance, that are disposed on the side of the water-liberating electrode chamber are designed as hydrophilic, and the gas diffusion layers 32.1" and 32.2' that are disposed on the side of the water-absorbing electrode chamber are designed as hydrophobic.

In FIG. 3, a further fuel cell 1, which is operated in the cocurrent mode, is shown schematically. At the lower end 7, both the incoming cathode stream 12 and the incoming anode stream 22 enter the cathode chamber 11 and the anode chamber 21, respectively. On the upper end 8, both the outgoing cathode stream 13 and the outgoing anode stream 23 exit the cathode chamber 11 and the anode chamber 21, respectively. In the cocurrent mode, a compensation region must be provided on the end 7, making for three different alternatives; in the first, water-permeable material is used; in the second, water-permeable and additionally only heat-permeable material are used; and in the third, only heat-permeable material is used. In the second alternative, either the water-permeable region or the region that is only heat-permeable can directly adjoin the MEA 2. In addition, it is conceivable in each case that the water-permeable compensation region on the side of the cathode chamber 11 is equipped with a catalyst layer and/or a GDL and on the side of the anode chamber 21 is equipped with a GDL. Of these alternatives, only one is shown in FIG. 3. The PEM 3 of the MEA 2 is lengthened on the end 7 where the incoming cathode stream 12 and the incoming anode stream 22 flow in and thus creates a compensation region 31'''. Because along with the incoming anode stream 22 a moist and warm anode recirculation stream 24 also flows into the anode chamber 21, a concentration gradient of the water toward the cathode chamber 11 occurs, so that water diffuses through the region 31''' as indicated by the arrow 34''' and moistens the incoming cathode stream 12. On the side of the compensation region 31''' pointing toward the cathode chamber 11, a catalyst layer 33 is applied, which serves to allow the hydrogen likewise diffusing through the region 31''' to react in a controlled way. The coolant preferably flows in the same direction as the streams of material, and flows of heat in both directions are conceivable, depending on the temperature of the incoming streams.

The foregoing relates to preferred exemplary embodiments of the invention, it being understood that other variants and embodiments thereof are possible within the spirit and scope of the invention, the latter being defined by the appended claims.

We claim:

1. A method for moistening and/or tempering at least one fuel cell in a fuel cell system, the fuel cell having
    an anode, a cathode, a membrane element, two electrode chambers disposed in the fuel cell which include an anode chamber and a cathode chamber, educts flowing respectively into the anode chamber and into the cathode chamber via a respective incoming stream, and at least one compensation region being disposed on an end of the membrane element, which compensation region contains a water-permeable part which moistens and/or tempers at least one of the incoming streams, and wherein a gas diffusion layer is disposed only on a side of the water-permeable part pointing toward the cathode chamber and/or the anode chamber, the method includes the following steps:
    inflow of the educts, which are contained in the incoming streams, into the fuel cell;
    electrochemical reaction of the educts, so that water is generated;
    diffusion of the water from a first of the electrode chambers through the gas diffusion layer of the compensation region and the membrane element into a second of the electrode chambers, and/or conduction of an amount of heat through the compensation region between the electrode chambers, so that the incoming stream of the second electrode chamber is moistened and/or tempered.

2. The method as defined by claim 1, wherein the fuel cell system is a system comprising polymer-electrolyte membrane fuel cells, and the membrane element together with the anode and the cathode forms a membrane-electrode array.

3. The method as defined by claim 1, wherein the anode chamber and the cathode chamber each have an extension, and a length of the extension is essentially equivalent to a length of the compensation region.

4. The method as defined by claim 2, wherein the anode chamber and the cathode chamber each have an extension, and a length of the extension is essentially equivalent to a length of the compensation region.

5. The method as defined by claim 1, wherein the compensation region contains a water-permeable part.

6. The method as defined by claim 2, wherein the compensation region contains a water-permeable part.

7. The method as defined by claim 3, wherein the compensation region contains a water-permeable part.

8. The method as defined by claim 4, wherein the water-permeable part, on a side pointing toward the cathode chamber, contains a catalyst layer.

9. The method as defined by claim 7, wherein the water-permeable part, on a side pointing toward the cathode chamber, contains a catalyst layer.

10. The method as defined by claim 5, wherein a gas diffusion layer is disposed on a side of the water-permeable part pointing toward the cathode chamber and/or the anode chamber.

11. The method as defined by claim 8, wherein a gas diffusion layer is disposed on a side of the water-permeable part pointing toward the cathode chamber and/or the anode chamber.

12. The method as defined by claim 10, wherein the gas diffusion layer that points toward a water-liberating electrode chamber, is hydrophilic, and the gas diffusion layer that points toward a water-absorbing electrode chamber is hydrophobic.

13. The method as defined by claim 11, wherein the gas diffusion layer that points toward a water-liberating electrode chamber, is hydrophilic, and the gas diffusion layer that points toward a water-absorbing electrode chamber is hydrophobic.

14. The method as defined by claim 1, wherein the compensation region has a temperature and media-stable seal.

15. The method as defined by claim 1, wherein in a countercurrent mode, the water of an outgoing stream of the anode chamber moistens the incoming stream of the cathode chamber, and/or the water of an outgoing stream of the cathode chamber moistens the incoming stream of the anode chamber.

16. The method as defined by claim 1, wherein in a cocurrent mode, the water, via an anode recirculation stream, is used for moistening the incoming stream of the cathode chamber.

17. The method as defined by claim 1, wherein the amount of heat conducted through the compensation region is heat from the electrochemical reaction or from a compression of an educt.

18. The method as defined by claim 1, wherein a coolant flowing through a separate chamber, in a portion of the electrode chamber in a region of the compensation region, tempers at least one incoming stream.

19. A fuel cell system operated by a method as defined by claim 1.

* * * * *